Jan. 9, 1968   R. A. WILLIAMS ET AL   3,362,441
DISPENSING APPARATUS
Filed July 23, 1965   5 Sheets-Sheet 1
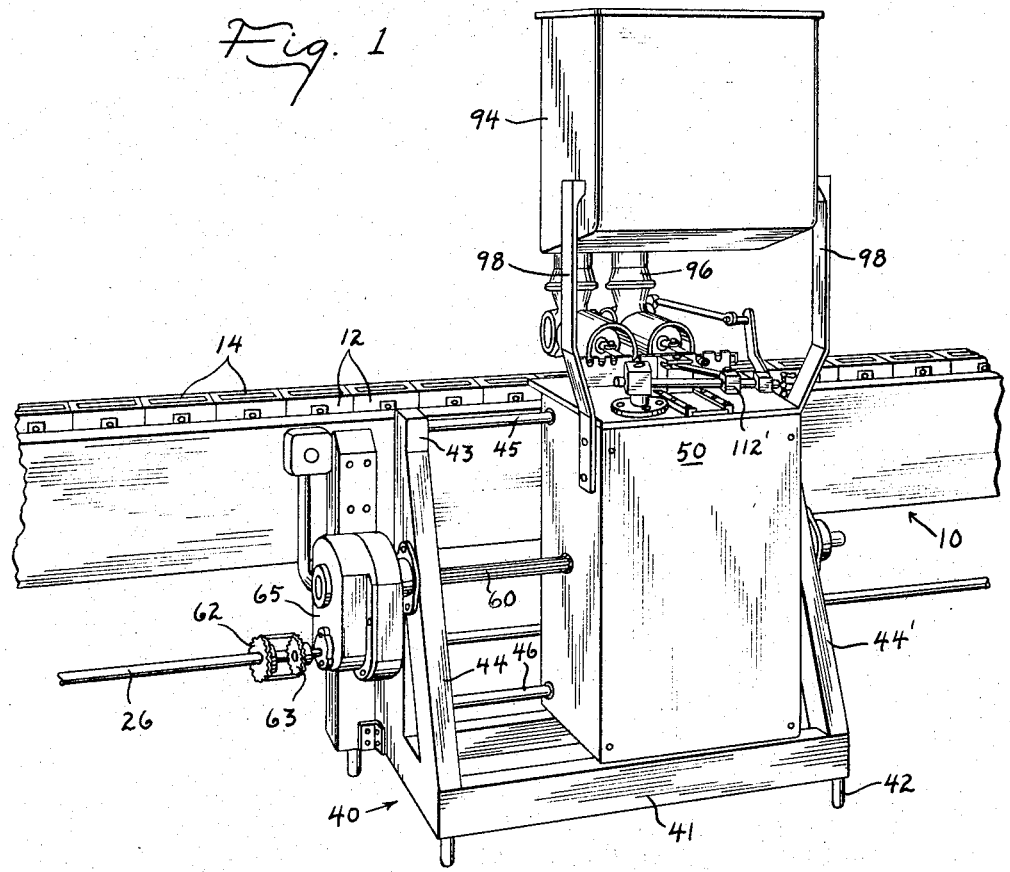
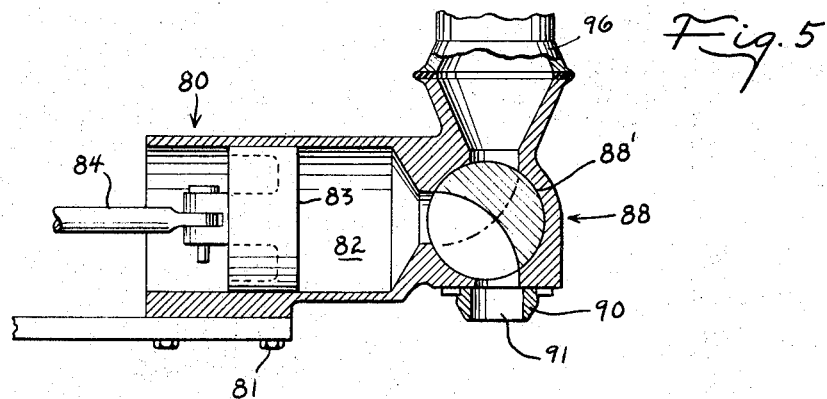
Inventors
Romaine A. Williams
Ralph F. Anderson
By McCanna, Morsbach & Pillote
Attys

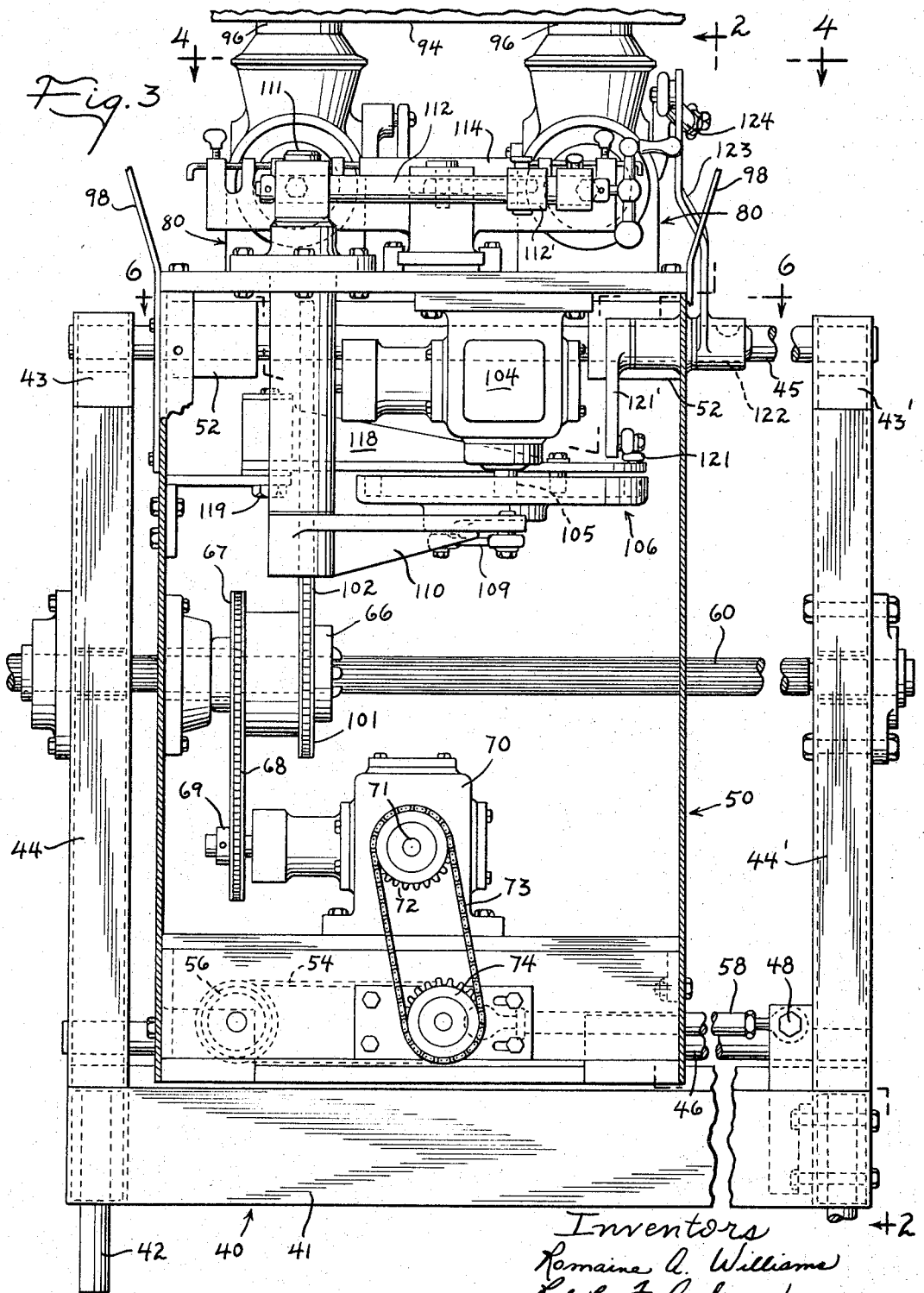

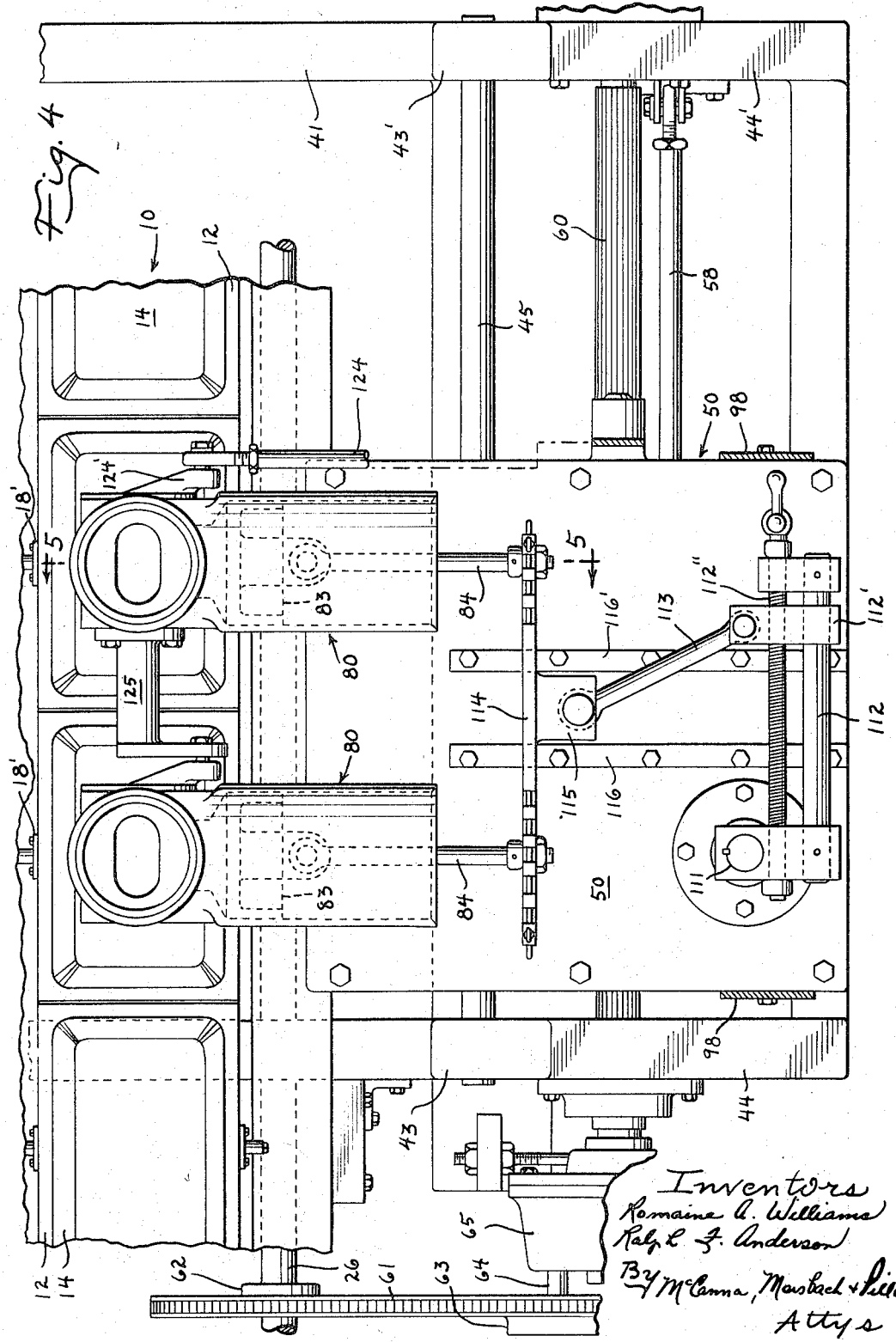

Inventors
Romaine A. Williams
Ralph F. Anderson
By McCanna, Morsbach & Pillote
Attys

United States Patent Office 3,362,441
Patented Jan. 9, 1968

3,362,441
DISPENSING APPARATUS
Romaine A. Williams and Ralph F. Anderson, Rockford, Ill., assignors to Ralph F. Anderson, Rockford, Ill.
Filed July 23, 1965, Ser. No. 474,316
8 Claims. (Cl. 141—137)

ABSTRACT OF THE DISCLOSURE

A continuously moving conveyor advances containers therealong. A reciprocable support is mounted on a stationary support and has a hopper, piston-type dispensers, and nozzle thereon. A spline shaft is operatively connected to the conveyor drive and operates mechanism to move the reciprocable support and to dispense a product into the moving containers.

This invention relates in general to dispensing machines and more particularly to reciprocating dispensing apparatus.

It is an important object of this invention to provide a reciprocating dispensing apparatus including a conveyor for advancing a plurality of receivers therealong, nozzle means disposed above the conveyor, and reciprocating means operated in timed relation to the conveyor whereby a product is dispensed to a moving receiver while the nozzle means is moving in the same direction as the conveyor.

Another object is to provide a reciprocating dispensing apparatus in accordance with the foregoing object in which the means for reciprocating the apparatus is operatively connected to the conveyor drive.

It is a further object of this invention to provide a reciprocating dispensing apparatus adapted to dispense measured quantities of a product and which is adjustable to vary the quantity dispensed thereby.

Still another object is to provide a reciprocating dispensing apparatus including a conveyor for advancing a plurality of receivers in one direction therealong, and a piston type dispensing means which is moved at generally the same speed as the receivers and arranged so that the product is dispensed to the moving receivers while the dispensing means is moving in said one direction.

A further object of this invention is to provide a reciprocating dispensing apparatus in accordance with the foregoing objects wherein the piston type dispensing means is operatively connected to the conveyor drive.

Yet another object of this invention is to provide a reciprocating dispensing apparatus including a conveyor which advances a plurality of receivers in one direction therealong, and a plurality of nozzles spaced at generally the same spacing as the receivers and including means for simultaneously dispensing a product through the nozzles as they are moved in said one direction and which are then reversed in direction to accommodate the following receivers.

Other objects of this invention are to provide a reciprocating dispensing apparatus including a conveyor which may be any one of various types and which dispensing apparatus will operate at any of various speeds that the conveyor may be operated, and to provide a reciprocating dispensing apparatus adaptable for fast, accurate filling of receivers advanced by the conveyor.

Other objects and advantages of this invention will be more readily appreciated as the same becomes better understood by reference to the following detailed description when taken in conjunction with the accompanying drawings wherein:

FIGURE 1 is a perspective view of an embodiment of this invention;

FIGURE 3 is a vertical sectional view taken along broken line 3—3 of FIG. 2;

FIGURE 4 is a view, in part sectional and in part elevational, taken along line 4—4 of FIG. 3;

Figure 6:
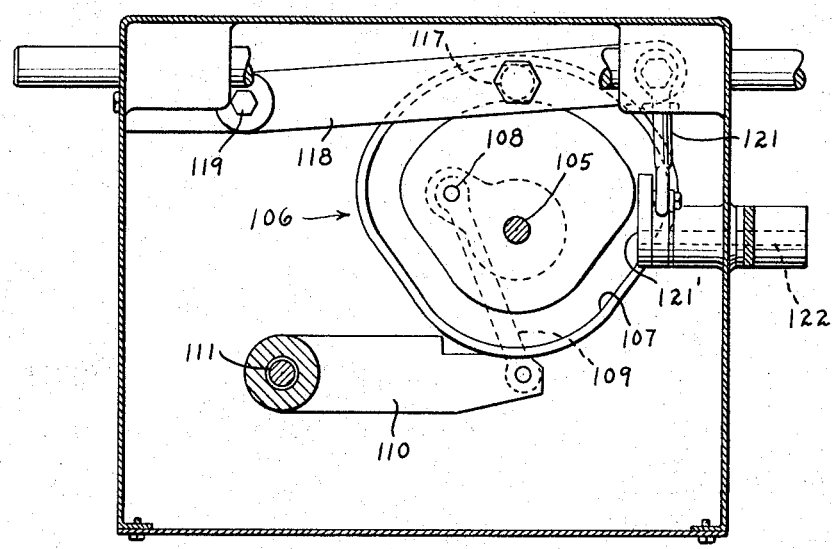
Figure 7:
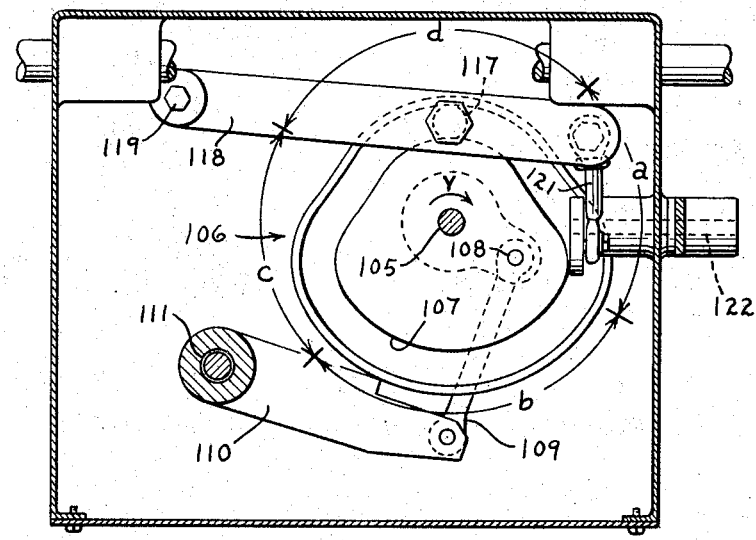

FIGURE 5 is a sectional view through the nozzle and dispensing apparatus taken along line 5—5 of FIG. 4; and FIGURES 6 and 7 are horizontal sectional views taken generally along broken line 6—6 of FIG. 3 and showing various move positions of the cam mechanism.

Reference is now made more particularly to the drawings wherein the same numerals indicate the same parts throughout the several views.

Figure 2:
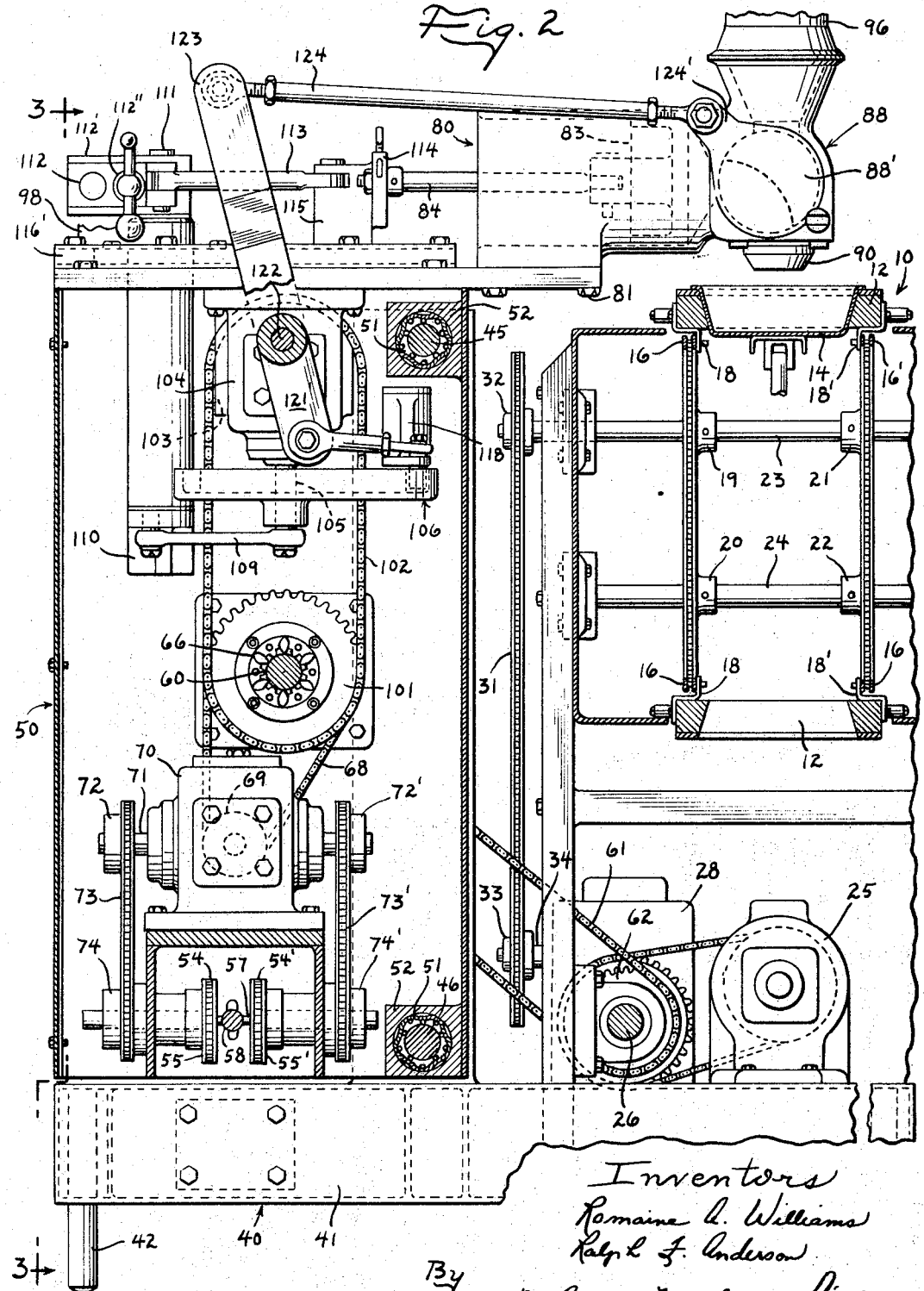
FIGURE 2 is a vertical sectional view taken along broken line 2—2 of FIG. 3.

FIGURES 1 and 2 best illustrate a conveyor which is generally indicated by the numeral 10. The conveyor may be of any kind suitable for advancing a plurality of receivers therealong and is herein illustrated as a continuous type conveyor having a plurality of receptacles 12 for carrying the receivers, herein shown in the form of containers 14. It should be understood that other means may be provided for advancing the receivers along the conveyor and that, while the receivers 14 are shown generally close together, they may be spaced at any distance required by the particular operation involved. It is preferable, however, that the receivers be generally equally spaced from each other and that their location on the conveyor be well defined for a purpose which will hereinafter become apparent. In the embodiment illustrated, the locations of the receivers are defined by having the receptacles 12 connected to conveyor chains 16 and 16', as by connectors 18 and 18'. The conveyor chains conveniently pass around sprockets such as sprockets 19–22 mounted on shafts 23 and 24, as best shown in FIG. 2. The conveyor may be driven in any convenient manner and is herein illustrated as having shaft 23 operatively connected to a motor 25. As shown in FIG. 2, this connection made through jack shaft 26, gear box 28, and chain 31 which connects sprockets 32 and 33, mounted on shaft 23 and gear box shaft 34, respectively.

Referring again to FIG. 1, there is illustrated a first support means shown in the form of a frame, generally designated 40, and a second support means slidably mounted thereon and shown in the form of a housing, generally designated by the numeral 50. In the embodiment illustrated, the frame includes a base 41, legs 42, and side members including generally upright members 43 and 43', and inclined support members 44 and 44'. Guideways, in the form of shafts 45 and 46 are mounted between members 43 and 43' in any convenient manner. The housing 50 is slidably mounted on shafts 45 and 46 as by a plurality of bearings 51 which are attached to the housing by mountings 52, as best shown in FIG. 2.

Means is provided for reciprocating the housing 50 along the guide shafts 45 and 46. As shown in FIGS. 2 and 3, this reciprocating means is in the form of generally parallel chains 54 and 54' extending around sprockets 55 and 56. A connecting link 57 is attached to chains 54 and 54' in any convenient manner for movement therewith. A tie rod 58 is pivotally connected to connector 57 at one end (see FIG. 2) and to frame 40 at the other end as by fastener 48 (see FIG. 3). As the chains move along their respective paths, the connector 57 will move therealong thereby causing housing 50 to be reciprocated with respect to frame 40 since tie rod 58 is connected thereto. As the connector moves along the periphery of the sprockets adjacent to either end of the path, it can be seen that the connector's relative horizontal movement slows prior to reversal of direction and, in this manner, advantageously provides a smooth operating reciprocating mechanism.

It is contemplated that the housing be reciprocated in timed relation to movement of the conveyor 10. The reciprocating mechanism is advantageously driven by a spline shaft 60 which is operated in timed relation with the conveyor and, in the embodiment illustrated, the spline shaft is operatively connected to jack shaft 26 of the conveyor. As best shown in FIG. 4, a chain 61 connects sprocket 62 mounted on jack shaft 26 and sprocket 63 mounted on shaft 64 which extends into gear box 65. Gear box 65 is mounted on the end of spline shaft 60 near one side of frame 40. A slip joint 66 is slidably mounted on spline shaft 60 for rotation therewith, as best shown in FIGS. 2 and 3. The reciprocating mechanism, previously described, is operatively connected to a sprocket 67 mounted on slip joint 66. Rotation of sprocket 67 is transferred through chain 68 and sprocket 69 to gear box 70 which is conveniently mounted inside housing 50 and adjacent to the base thereof. As best shown in FIG. 2, a shaft 71 extends out either side of the gear box 70 and transmits motion to sprockets 72 and 72'. These, in turn, are operatively connected to sprockets 55 and 55' respectively, of the reciprocating means through chains 73 and 73' and sprockets 74 and 74'.

It is now deemed apparent that movement of the conveyor drive means will impart rotation to the jack shaft 26 and that this, in turn, is positively connected to spline shaft 60 so that the spline shaft is rotated at a speed correlative to the speed of the conveyor. The aforedescribed reciprocating mechanism is likewise operatively connected to the spline shaft with the result that movement of the conveyor causes the housing 50 to reciprocate along the shafts 45 and 46 of frame 40 so that the reciprocation of the housing 50 will be correlative with the speed of the conveyor 10. Through choice of gearing ratios, it is obvious that the speed of the reciprocation can be in any of various ratios to the speed of the conveyor; however, it is preferable that the housing move at substantially the same speed as the receivers are moved for filling purposes which will hereinafter be described. It is contemplated that slight variations in the speed of the receiver and filling mechanism will not be critical, in fact may be desirable in certain filling operations, and that this can be achieved by selection of gearing ratios and the arrangement of the reciprocating apparatus.

As indicated above, a product is dispensed to the receivers as they are moving along the conveyor. For this purpose, a filler or dispensing apparatus, generally designated by the numeral 80, is mounted on the housing by means of fasteners 81, as best seen in FIG. 2. As best shown in FIG. 5, the dispensing apparatus includes a measuring chamber in the form of cylinder 82, a movable wall in the form of piston 83 disposed inside the chamber and a rod 84 attached to the wall for moving the same. Adjacent one end of the dispensing apparatus is a valve mechanism 88 operative in one position for discharge of material in the measuring chamber through a discharge nozzle 90, as illustrated in FIG. 5. The nozzle is disposed at a level above the receivers 14 and has a downwardly facing discharge opening 91 arranged so that the material dispensed by the dispensing apparatus is directed downwardly to the receivers. In a second position, illustrated in phantom in FIG. 5, the valve is operative to direct the flow of material from a storage means or hopper 94 to the measuring chamber of the dispensing apparatus. A conduit means 96 conveniently connects the hopper to the valve. In the embodiment illustrated in FIG. 1, the hopper 94 is conveniently mounted on the housing 50 by means of supports 98; however, it is contemplated that other means may be utilized for feeding the product to the dispensing apparatus whereby the hopper need not be mounted on the housing.

It has been seen that the nozzle 90 is disposed above the receivers and is mounted for movement with the housing 50. The valve mechanism 88 is arranged to be in dispensing position as the nozzle is moved in the same direction as the receivers and to be in measuring position for flow of material to the dispensing apparatus 80 from the hopper 94 when the nozzle is moved in a direction opposite to the direction of movement of the receivers. Similarly, the dispensing apparatus 80 is arranged to dispense the material when the valve is in dispensing position and to measure a quantity of material when the valve is in measuring position. The manner of operation of the valve mechanism and the dispensing apparatus will now be described. In general, the valve mechanism and the dispensing apparatus are each connected by linkage to individual cam means which are, in turn, operatively connected to spline shaft 60. As best illustrated in FIGS. 2 and 3, a sprocket 101 is mounted on slip joint 66 for rotation therewith in in response to spline shaft 60. This motion is transmitted through chain 102 and sprocket 103 to gear box 104. A shaft 105 extends from gear box 104 and is rotated thereby and a cam apparatus 106 is mounted thereon. As best illustrated in FIGS. 6 and 7, the cam apparatus 106 includes a cam track 107 for controlling the valve mechanism and an eccentric 108 for controlling the dispensing apparatus. Eccentric 108 is attached to shaft 111 through a linkage including a link 109 and an arm 110. The shaft 111 extends to a level above the housing 50 as seen in FIG. 4 and is attached to piston rod 84 through linkage including an arm assembly 112 attached to the shaft 111; a link 113, and a crosshead 114 attached to the piston rods. The arm assembly 112 is arranged to provide an adjustable effective length to vary the stroke of the pistons and, as shown, includes a slide member 112' adjustable along the arm as by a screw 112". It should be obvious that through selection of gearing ratios, the eccentric 108 can be arranged to make one revolution for each reciprocation of the housing 50 and thereby impart a measuring stroke and dispensing stroke at the proper intervals. The crosshead 114 is advantageously provided with a slide body 115 which slides between guides 116 and 116'. In this manner, crosshead 114 may be used to operate a plurality of dispensing apparatus, as best illustrated in FIGS. 3 and 4, for purposes which will hereinafter be discussed.

As stated above, cam apparatus 106 has a cam track 107 for controlling the movement of the valve mechanism 88. The cam track 107 is advantageously arranged so that the valve mechanism will quickly move to its required position and then dwell there for a specified length of time. As shaft 105 rotates in the direction indicated by arrow y, the cam apparatus will rotate in the same direction. A follower 117 is arranged in the cam track 107 and will cause arm 118 to oscillate about a pivot 119 in accordance with the cam track 107, as best shown in FIGS. 6 and 7. As the cam apparatus moves through angle designated by a in FIG. 7, the valve apparatus is arranged to move to position open to the hopper 94. Cam track 107 is substantially equidistant from shaft 105 in the angle designated by b whereby the valve apparatus will dwell in the aforesaid open position during movement through this angle. While moving through the angle indicated by c the valve mechanism will open to the nozzle apparatus 90 and will dwell in that position during the angle indicated at d. In the embodiment illustrated, angles a and c are advantageously 60° and angles b and d are advantageously 120°; however, it is contemplated that other arrangements and other angles may be utilized, if desirable. Oscillation of arm 118 is imparted through linkage including a link 121 and an arm 121' secured to a shaft 122, as best seen in FIGS. 6 and 7. Shaft 122 is rotatably mounted on housing 50 and, as best shown in FIGS. 2 and 3, extends through the housing where it is connected to an arm 123 attached to linkage including link 124 and an arm 124' connected to the rotary valve member 88' of the valve mechanism 88. As best seen in FIGS. 3 and 4, the embodiment of the present invention may include a multiple of dispensing apparatus and, in such circumstance, the rotary valve members 88' of such plural dispensing means may be conveniently interconnected by linkage, best shown at 125 in FIG. 4. In this manner, the valves will operate simultaneously.

As best seen in FIG. 4, the dispensing means are spaced apart substantially equal to the spacing of the receivers 14. In this manner, for example, two receivers may be filled simultaneously and the housing reciprocated back to the point of beginning to service the following two receivers.

It is now deemed apparent that, in the embodiment illustrated, the housing 50 is reciprocated at substantially the same speed as movement of the receivers 14 along the conveyor. The nozzles are arranged above the receivers and the dispensing apparatus is arranged to dispense the material therethrough as the receivers are moving in said direction. Thereafter, the housing reciprocates back to a point of beginning to service the following receivers. In this manner, the material can be dispensed to receivers while they are moving along the conveyor. By moving the housing in timed relation to the movement of the conveyor, the speed of the conveyor is unimportant since the housing will reciprocate at that speed and the piston dispensers will similarly be operated at a speed correlated with the speed of the conveyor. In the preferred form illustrated, this is achieved by a positive connection to the jack shaft of the conveyor.

While we have thus described a preferred embodiment of our invention, it has been done by way of illustration and not limitation and we do not wish to be limited except as required by the appended claims.

We claim:

1. In combination with a conveyor for advancing a plurality of receivers in one direction, and drive means for driving the conveyor, the improvement comprising an apparatus for dispensing a product to the receivers as they are advanced along the conveyor, said apparatus including a first support means, a spline shaft rotatably mounted on said first support means and generally parallel to the conveyor, means operatively connecting the spline shaft to the drive means for rotation at a speed correlative to the speed of the conveyor, a second support means slidably mounted on the first support means for movement generally parallel to the conveyor, reciprocating means for moving said second support means, means operatively connecting the reciprocating means to the spline shaft for moving the second support means in said one direction at substantially the same speed as the conveyor, a filler unit mounted on said second support means for movement therewith, said filler unit including a nozzle having a downwardly facing discharge opening disposed above the conveyor, a piston-type dispensing means for dispensing a predetermined quantity of a product through said discharge opening, and means slidably connected to the spline shaft for operating the dispensing means to dispense the product as the second support means is moved in said one direction.

2. In combination with a conveyor for advancing a plurality of receivers in one direction, and drive means for driving the conveyor, the improvement comprising an apparatus for dispensing a product to the receivers as they are advanced along the conveyor, said apparatus including a first support means, a spline shaft rotatably mounted on said first support means generally parallel to the conveyor, means operatively connecting the spline shaft to the drive means for rotation at a speed correlative to the speed of the conveyor, a second support means slidably mounted on the first support means for movement generally parallel to the conveyor, reciprocating means for moving said second support means, means operatively connecting the reciprocating means to the spline shaft for moving the second support means in said one direction at substantially the same speed as the conveyor, filler means mounted on said second support means for movement therewith, said filler means including nozzle means having a downwardly facing discharge opening disposed above the conveyor, a measuring chamber communicating with said nozzle means, a movable wall in said chamber, a valve means operable in one position for admitting a product into said chamber and operable in a second position for discharge of the product from the chamber through said discharge opening, cam means operatively connected to said movable wall and said valve means for moving said valve means to said second position and moving said wall to dispense the product as said second support means is moved in said one direction, and means connecting said cam means to said spline shaft for operating the same in timed relation to the conveyor.

3. The combination of claim 2 including means for adjusting the stroke of said movable wall thereby varying the quantity of product dispensed.

4. In combination with a conveyor for advancing a plurality of generally equally spaced receivers in one direction, and drive means for driving the conveyor, the improvement comprising an apparatus for dispensing a product to the receivers as they are advanced along the conveyor, said apparatus including a first support means, a spline shaft rotatably mounted on said first support means generally parallel to the conveyor, means operatively connecting the spline shaft to the drive means for rotation at a speed correlative to the speed of the conveyor, a second support means slidably mounted on the first support means for movement generally parallel to the conveyor, reciprocating means for moving said second support means, means operatively connecting the reciprocating means to the spline shaft for moving the second support means in said one direction at substantially the same speed as the conveyor, a pair of piston-type fillers mounted on said second support means for movement therewith, said fillers each including a nozzle having a downwardly facing discharge opening disposed above the conveyor, said discharge openings spaced generally equal to the spacing of said receivers and so arranged that they are positioned above two consecutive receivers as the second support means is moved in said one direction, a measuring chamber communicating with each nozzle, a movable wall in each chamber, valve means operable in one position for admitting a product into each chamber and operable in a second position for discharge of the product from the chambers through said discharge openings, means on said second support means operable for simultaneously moving said walls to discharge the product when the valve means is in said second position, said last-mentioned means and said valve means both operatively connected to said spline shaft for operation in timed relation to the conveyor and arranged for discharge of the product when the second support means is moved in said one direction.

5. An apparatus for use with a conveyor having drive means for driving the conveyor, said apparatus comprising stationary support means having guide means mounted thereon, second support means slidably mounted on the guide means, a spline shaft rotatably mounted on the stationary support means generally parallel to said guide means and adapted for operative connection to the conveyor drive means, reciprocating means for moving said second support means, means operatively connecting the reciprocating means to the spline shaft for movement correlative thereto, a piston-type dispensing means for dispensing a predetermined quantity of a product therefrom and mounted on said second support means for movement therewith, nozzle means connected to the dispensing means and having a downwardly facing discharge opening, and means operatively connecting the dispensing means to the spline shaft for operating the same to dispense a product as the second support is moved in one direction.

6. An apparatus for use with a conveyor having drive means for driving the conveyor, said apparatus comprising a stationary support means having guide means mounted thereon, a second support means slidably mounted on the guide means, a spline shaft rotatably mounted on the stationary support means generally parallel to said guide means and adapted to be operatively connected to the conveyor drive means, a reciprocating means for moving said second support means along the guide means, said reciprocating means including means for reducing the speed prior to reversal of direction, slide means mounted on the spline shaft for rotation therewith and for movement therealong, said slide means including means connecting the same to the second support means for reciprocal movement therewith, means operatively connecting the slide means to the reciprocating means to drive the same in response to rotation of the spline shaft, a nozzle means mounted on the second support means for movement therewith and having a downwardly facing discharge opening, a measuring chamber communicating with the nozzle means, valve means operable in one position for admitting a product into said chamber and operable in a second position for discharge of the product through the discharge opening, a movable wall in said chamber, cam means operatively connected to said valve means and to said wall for moving the wall and valve means to discharge the product when the valve means is in said second position, and means operatively connecting the cam means to the slide means to operate the same in response to rotation of the spline shaft.

7. In an apparatus including a conveyor for advancing a plurality of receivers in a straight line in one direction, and first drive means for moving the conveyor, the improvement comprising:
 a first support;
 a second support slidably mounted on the first support for movement generally parallel to the conveyor;
 a filler mounted on the second support and including: a nozzle having a downwardly facing discharge opening disposed above the receivers, a piston-type dispensing means for dispensing a predetermined quantity of a product through the nozzle, and valve means operative in one position to allow flow from the piston-type dispensing means to the nozzle and operative in another position to allow flow into the dispensing means;
 second drive means operatively connected to the first drive means for reciprocating the second support in timed relation to the conveyor and including: a keyed shaft extending generally parallel to the conveyor, and a keyed member providing a driving and slidable connection to the shaft; and
 means on the second support and driven by said second drive means for operating the valve means and the piston-type dispensing means so that the valve means is in said one position and the product is dispensed as the second support is moved in said one direction.

8. In an apparatus including a conveyor for advancing a plurality of receivers in a straight line in one direction, and first drive means for moving the conveyor, the improvement comprising: a first support; a second support slidably mounted on the first support for movement generally parallel to the conveyor; a nozzle mounted on the second support for movement therewith and having a downwardly facing discharge opening disposed above the receivers; a piston-type dispensing means mounted on the second support for movement therewith and adjacent the nozzle for dispensing a predetermined quantity of a product through the nozzle; valve means mounted on the second support and operative in one position to allow flow from the piston-type dispensing means to the nozzle and operative in another position to allow flow into the piston-type dispensing means; means connected to the second support for reciprocating the second support in timed relation to the conveyor; a keyed shaft extending generally parallel to the conveyor and driven in timed relation thereto; a keyed member providing a driving and sliding connection to the keyed shaft; and means on the second support and driven through said driving and sliding connection for operating the valve means and the piston-type dispensing means to dispense the product as the second support is moved in said one direction.

References Cited

UNITED STATES PATENTS

| | | | |
|---|---|---|---|
| 2,757,844 | 8/1956 | Greissman | 141—137 |
| 3,100,513 | 8/1963 | Cozzoli et al. | 141—137 X |
| 3,191,643 | 6/1965 | Roth | 141—137 |
| 2,388,036 | 10/1945 | Bingham | 141—137 |

LAVERNE D. GEIGER, *Primary Examiner.*

H. S. BELL, *Assistant Examiner.*